United States Patent Office 3,445,884
Patented May 27, 1969

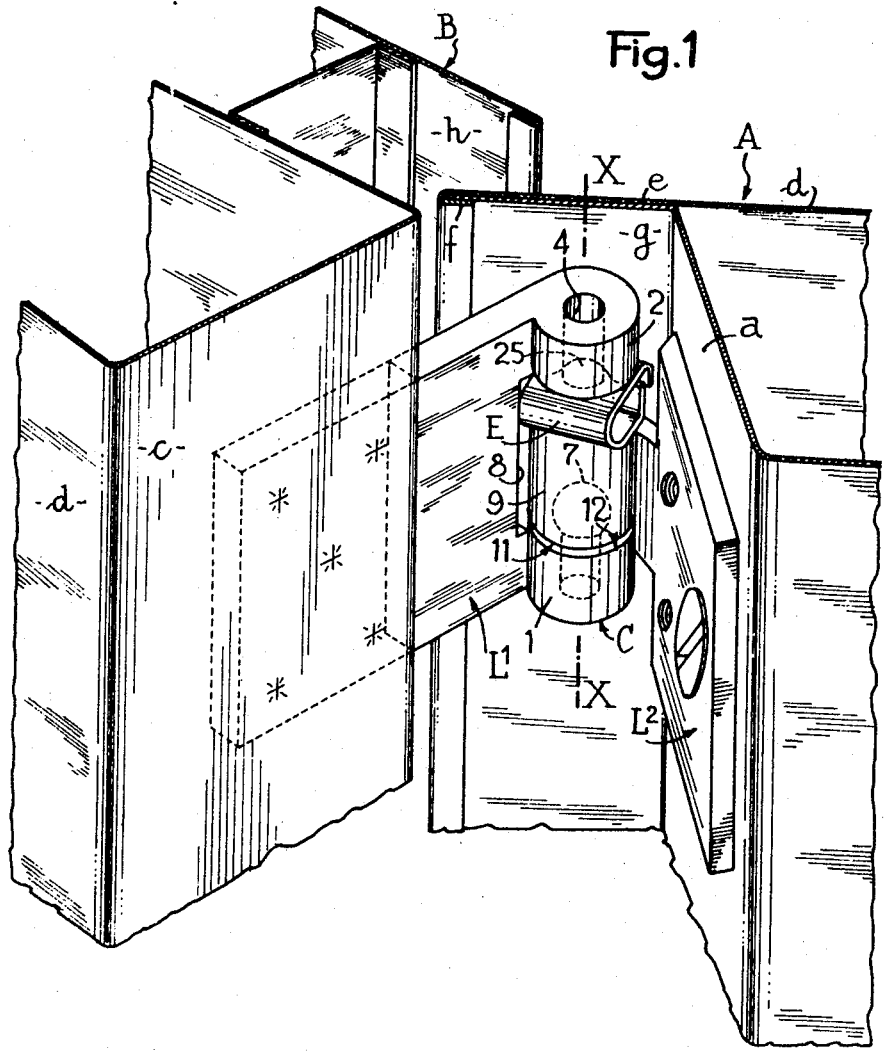
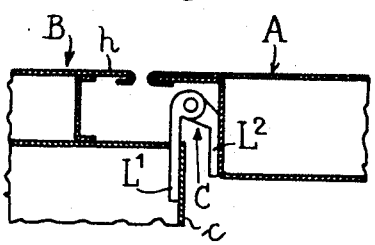
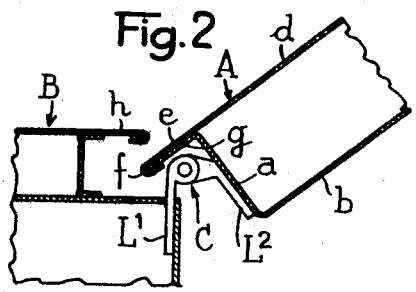

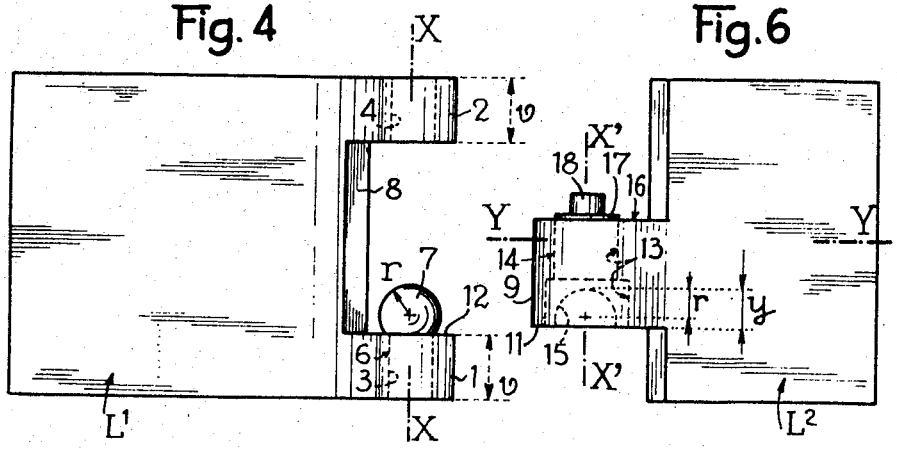
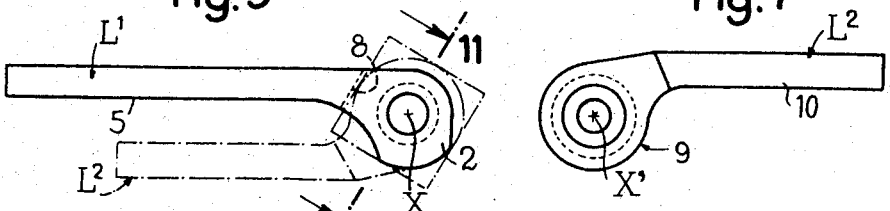
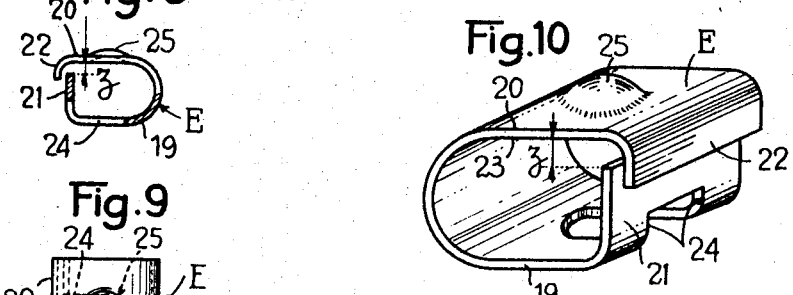
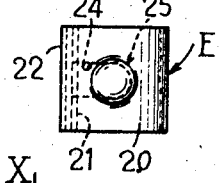
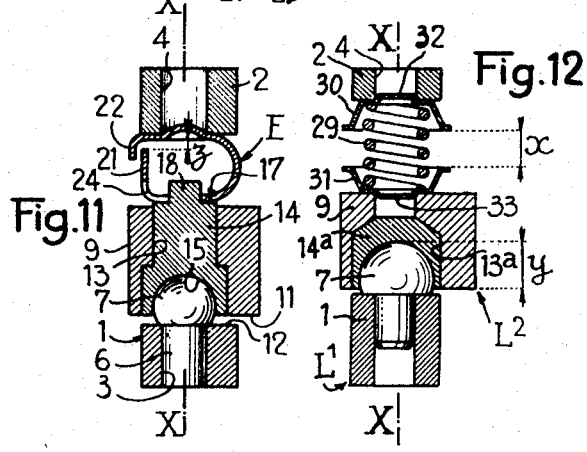

3,445,884
HINGE, IN PARTICULAR FOR AN AUTOMOBILE VEHICLE DOOR
Marcel Dangauthier, Paris, France, assignor to Societe Industrielle et Commerciale des Automobiles Peugeot, Paris, France
Filed May 10, 1967, Ser. No. 637,536
Claims priority, application France, May 13, 1966, 61,463
Int. Cl. E05d 9/00, 15/00, 11/04
U.S. Cl. 16—128                                11 Claims

ABSTRACT OF THE DISCLOSURE

A hinge in which an elastically compressible means is disposed in the pivot axis between the upper branch of the fork portion of the first hinge part and an extension portion of the second hinge part so as to maintain in axial engagement a ball element provided on the lower branch of the fork portion and a bearing portion on extension portion, abutment means being provided to limit the possible axial compression of the compressible means to a value sufficient to allow disengagement of the latter but insufficient to allow total axial disengagement of the bearing portion from the ball element.

---

The present invention relates to a hinge which is simple in construction, automatically takes up play and permits an easy and very rapid assembly and disassembly of the element mounted by means of this hinge, the latter being more particularly, although not exclusively, provided for the pivotal mounting of an automobile vehicle door on the base or post of the body of the vehicle forming a frame.

In the hinge according to the invention, a first of the two hinge parts forms a fork having an upper branch and a lower branch which latter carries a ball element located between said branches on the pivot axis of the hinge, the second of said hinge parts being extended by a pivotal portion which is disposed with clearance between said branches and has a bearing portion which engages round and bears against the ball element, an elastically compressible means for elastically maintaining the ball element and bearing portion interengaged, said compressible means being engaged with said second branch and with said pivotal portion on said axis in such manner as to be maintained in position radially of said axis.

According to one embodiment of the invention, said elastically compressible means comprises a coil spring the aixs of which coincides with said pivot axis, and abutment means for limiting the possible axial compression of the spring to a value sufficient to allow disengagement of the compressible means from said second branch and said pivotal connection but insufficient to allow total axial disengagement of said ball and bearing portion.

Further features and advantages of the invention will be apparent from the ensuing description, with reference to the accompanying drawings.

In the drawings:

FIG. 1 is a perspective view of a hinge according to the invention in position on a door of an automobile vehicle;

FIGS. 2 and 3 are diagrammatic cross-sectional views of the hinge with the door in the open and closed position respectively;

FIG. 4 is an elevational view of the hinge part in the form of a fork;

FIG. 5 is a plan view of the part shown in FIG. 4 with the second hinge part shown in dot-dash line in the closed position of the door;

FIGS. 6 and 7 are respectively an elevational view and a plan view of the second hinge part;

FIGS. 8 and 9 are respectively an elevational view and a plan view of the elastically yieldable element;

FIG. 10 is a perspective view of the elastically yieldable element;

FIG. 11 is a sectional view of the assembly of the hinge, this view being taken along line 11—11 of FIG. 5, and FIG. 12 is a sectional view similar to FIG. 11 of a modification of the hinge according to the invention.

According to the illustrated embodiment, there will be described in its application to the illustrative pivotal mounting of a door A (FIGS. 1–3) on the body B of a vehicle, the hinge C according to the invention connecting the lateral portion $a$ of the inner panel of the door $b$ to the lateral wall of the entrance foot $c$ of the door, the outer panel $d$ of the door extending at $e$ so as to be formed over at $f$ on a formed-over edge $g$ which terminates the inner panel $b$ in a direction parallel to this panel. The entrance foot carries a fixed outer wall $h$ which terminates in the immediate vicinity of the outer panel $d$ of the door when the door A is in the closed position and thus masks or hides the assembly of the hinge (FIG. 3).

The hinge C according to the invention comprises two parts, namely a first hinge strip or part $L^1$, a second hinge strip or part $L^2$, an elastically yieldable element or means E, the two hinge parts being respectively fixed for example to the entrance foot $c$ and to the door A and pivoted to each other for pivotal movement about an axis X—X which constitutes the pivot axis of the door A on the body B of the vehicle.

The first hinge part $L^1$ (FIGS. 1, 4 and 5) is adapted to be secured for example to entrance foot $c$ and forms a fork whose two branches constitute eyes 1 and 2 having apertures 3 and 4 with a common axis X—X. These eyes are laterally offset so that the axis X—X is slightly offset from the face 5 (FIG. 5) which faces outwardly of the entrance foot $c$. These two eyes have the same width $v$ (FIG. 4) so that the hinge part $L^1$ is adaptable for a right or left door by inverting this part.

Attached to the eye at the lower end, namely eye 1 in the illustrated embodiment, by a stem 6 which is a tight fit, is a ball element 7. This ball element could also be attached by welding or even form part of the hinge part $L^1$, although this would of course require different hinge parts for the right and left doors.

The bottom of the space between two eyes 1 and 2 is machined at an inclination or chamfered at 8.

The second hinge part $L^2$ (FIGS. 6 and 7) is extended by a single eye 9 whose axis X'—X' is adapted to coincide with the axis of the hinge and is also offset from the face 10 of the hinge part which is outside the door A (FIG. 1). Further, this eye 9 is downwardly offset relative to the middle line Y—Y of the hinge part so that in the assembled position of the hinge, its lower face 11 is located very near, but slightly above, the upper face 12 of the eye 1 of the hinge part $L^1$.

The aperture 13 (FIG. 6) of the eye 9 is stepped and engaged in this eye and clamped and/or welded in position is a machined member 14 embodying the axis X'—X'. The member 14 comprises in its lower end face a part-spherical cavity 15 having the same radius $r$ as that of the ball element 7 and an axial extent or depth $y$ (FIG. 6) which is preferably slightly greater than $r$, this cavity consisting of a semispherical portion extended downwardly by a short cylindrical portion.

In the upper part, the machined member 14 extends from the face 16 of the eye 9 and it terminates adjacent a shoulder 17 in an axial and cylindrical spigot 18.

For reasons of economy, and in order to avoid maintenance lubrication operations, this member 14 is constructed advantageously of oil-impregnated sintered steel.

The element E (FIGS. 1 and 8–10) consists of a strip of spring steel or any other elastic material or metal bent into the form of a U, the two branches 19 and 20 being unequal in length and having juxtaposed but noncontacting flanges 21 and 22. The inner flange 21, namely that pertaining to the shorter branch 19, terminates at a distance $z$ from the inner face 23 of the other branch 20 and prevents any unhinging of the door after mounting by forming an abutment for the branch 20 which prevents a flattening of the element E. The other flange 22 is optional.

Provided in the middle part of the flange 21 and the branch 19 is an opening 24 whose width corresponds, apart from a very slight positive tolerance, to the diameter of the spigot 18 of the hinge part $L^2$.

The branch 20 has on its upper outer face a boss or projecting portion 25 constituting a second head.

The hinge is assembled in the following manner:

The hinge parts $L^1$ and $L^2$ being respectively secured to the door foot $c$ and the part A (or inversely), the eye 9 of the hinge part $L^2$ is engaged in the fork of the hinge part $L^1$ so that the cavity 15 of the member 14 rests on the associated ball element 7.

Thereafter, with the hinge in the open position (FIGS. 1 and 2), the elastically yieldable element E is introduced in a direction parallel to the chamfer or inclined face 8 of the hinge part $L^1$ against which one of the edges of the element E slides.

In the course of positioning the element, the opening 24 is positioned astride the spigot 18 of the member 14. Further, the clearance $z$ between the flange 21 of the branch 19 and the inner face 23 of the branch 20 of the element E allows by a pinching of this element and a partial elastic flattening thereof, the passage of the boss 25 which finally becomes locked in the aperture 4 of the eye 2 of the hinge part $L^1$.

The element E is prevented from rotating by the chamfered face 8 of the hinge part.

It should be mentioned that, during operation of the hinge, the element E only rubs on the shoulder 17 of the member 14 and if this surface, in the same way as the part-spherical surface, is composed of oil-impregnated sintered steel, a good permanent operation is achieved without need for maintenance lubrication.

The elastically yieldable element E being in position, the hinge part $L^2$ can only undergo a displacement along the axis X—X equal at the most to the clearance $z$, which is much smaller than the height $y$ necessary for disengaging the two associated part-spherical surfaces 7 and 15.

However, the hinge can be disassembled by carrying out operations which are the opposite to those for assembly and in particular by pinching the element E which constitutes a spring.

A modification of the hinge according to the invention is shown in FIG. 12 in which elements similar to the element of the embodiment just described carry similar reference characters.

In this modification, the elastically yieldable or compressible means $E^1$ comprises a coil spring 29 engaged at each end in the cavities of dished washers 30 and 31 of for example metal. These washers 30 and 31 have projecting portions 32 and 33 respectively, the projecting portion 32 being engaged in the aperture 4 in the eye 2 of the first hinge part $L^1$ and the projecting portion 33 being engaged in the aperture 13a of the eye 9 of the second hinge part $L^2$. Bearing member 14a differs from bearing member 14 in that no spigot 18 is provided. Thus the spring 29, which is under compression between the washers 30 and 31, is held in position radially of the pivot axis X—X of the hinge by the engagement of the portions 32 and 33 in the eyes 2 and 1 respectively.

A gap $x$ is provided between the washers 30 and 31 which is sufficient to allow the projecting portions 32 and 33 of the elastically compressible means $E^1$ to be engaged in the apertures 4 and 13a respectively or withdrawn therefrom by a small axial compression of the spring 29. This gap $x$ is less than the depth $y$ of engagement of the ball element 7 in the bearing member 14a so that the washers axially abut one another before the bearing member 14a can be totally disengaged from the ball element 7 when the eye 9 of the hinge part $L^2$ is raised relative to the hinge part $L^1$. In this way, the hinge parts cannot be accidentally disassembled.

The hinge according to the invention has in particular the following advantages:

It is of low cost owing to the methods adopted for constructing and assembling the various elements.

The hinge is rapidly and easily assembled and disassembled.

Maintenance is unnecessary owing to the use of an oil-impregnated material for the rubbing surfaces.

The door can be very easily adjusted when assembling in a way identical to that permitted by conventional hinges.

It is possible to disassemble and reassemble the door for various operations without disadjustment.

The hinge affords safety since it cannot be unhinged when the elastically yieldable means E or $E^1$ is in position and no force of reaction can cause this means to escape in use.

Although specific embodiments of the invention have been described, many modifications and changes may be made therein without departing from the scope of the invention as defined.

Having now described my invention what I claim as new and desire to secure by Letters Patent is:

1. A hinge, in particular for an automobile vehicle door, said hinge comprising a first hinge part and a second hinge part, the first hinge part being in the form of a fork having an upper branch and a lower branch, a ball element carried by said lower branch and located between said branches, the hinge having a pivot axis intersecting said ball element, the second hinge part having a pivotal extension portion which is disposed with clearance between said branches and has a bearing portion which engages around and bears against said ball element, an elastically compressible means for maintaining the two hinge parts elastically assembled, engaged with said second branch and with said pivotal extension portion on said pivot axis and means for maintaining said compressible means in position in the hinge radially of said pivot axis.

2. A hinge as claimed in claim 1, wherein said upper branch has an aperture on said pivot axis and said pivotal portion has a spigot on said pivot axis, said elastically compressible means being engaged at one end thereof in said aperture and at the other end thereof on said spigot.

3. A hinge as claimed in claim 1, wherein the ball element is attached to the first hinge part.

4. A hinge as claimed in claim 1, wherein the ball element is in one piece with the first hinge part.

5. A hinge as claimed in claim 2, wherein said lower branch forms an eye defining said aperture in which said compressible means is engaged.

6. A hinge as claimed in claim 2, wherein said bearing portion of the second hinge part and the spigot are formed at the ends of a machined member secured in said pivotal portion.

7. A hinge as claimed in claim 6, wherein the machined member is composed of oil-impregnated sintered steel.

8. A hinge as claimed in claim 2, wherein the elastically compressible means consists of a spring metal strip bent roughly in the form of a U having flanged branches, the lower branch thereof and the associated flange having an opening for engaging the spigot whereas the upper branch of the U-shaped strip comprises a projecting portion for engaging in the aperture of said upper branch and the flange associated with the lower branch of the strip terminates at a distance from the inner face of the upper branch of the strip which is such as to permit, by compressing said compressible means, the disengagement of the projecting portion from the aperture, abutment means being provided on the first hinge part so as to prevent the elastically compressible means from rotating relative to said first hinge part and said opening provided in said compressible means having such orientation that the spigot located in said opening prevents the compressible means from escaping when the door is closed.

9. A hinge, in particular for an automobile vehicle door, said hinge comprising a first hinge part and a second hinge part, the first hinge part being in the form of a fork having an upper branch and a lower branch, a ball element carried by said lower branch and located between said branches, the hinge having a pivot axis intersectong said ball element, the second hinge part having a pivotal extension portion which is disposed with clearance between said branches and has a bearing portion which engages around and bears against said ball element, a coil spring for maintaining the two hinge parts elastically assembled engaged with said second branch and with said pivotal portion, the axis of the spring coinciding with said pivot axis, means for maintaining said spring in position radially of said pivot axis, and abutment means for limiting the possible axial compression of said spring to a value sufficient to allow disengagement of the compressible means from said second branch and said pivotal connection but insufficient to allow total axial disengagement of said ball and said bearing portion.

10. A hinge as claimed in claim 9, wherein said abutment means comprises two washers coaxial with said spring and encompassing opposite end portions of said spring, said washers having projecting portions respectively engaged in an aperture in said upper branch and an aperture in said pivotal portion on said pivot axis, an axial gap being provided between said washers for allowing said limited axial compression of the compressible means.

11. A structure comprising an automobile vehicle door, a door frame and a hinge interconnecting the door and door frame, said hinge comprising a first hinge part, a second hinge part, the first hinge part being in the form of a fork having an upper branch and a lower branch, a ball element carried by said lower branch and located between said branches, the hinge having a pivot axis intersecting said ball element, the second hinge part having a pivotal extension portion which is disposed with clearance between said branches and has a bearing portion which engages around and bears against said ball element, an elastically compressible means for maintaining the two hinge parts elastically assembled engaged with said second branch and with said pivotal extension portion on said pivot axis and means for maintaining said compressible means in position in the hinge radially of said pivot axis, said door having a panel which covers and hides said hinge in the closed position of the door.

References Cited
UNITED STATES PATENTS 1,840,211    1/1932    Reinhart ———————— 16—128 XR
2,255,529    9/1941    May ———————————— 16—136 XR BOBBY R. GAY, *Primary Examiner.*

JAMES L. KOHNEN, *Assistant Examiner.*

U.S. Cl. X.R.

16—136, 171